US00RE44626E

(19) United States
(12) Reissued Patent
Ma

(10) Patent Number: US RE44,626 E
(45) Date of Reissued Patent: Dec. 3, 2013

(54) APPLICATION APPARATUS AND METHOD

(75) Inventor: Sherman Ching Ma, Rowland Heights, CA (US)

(73) Assignee: Juno Holdings S.A.R.L., Luxembourg (LU)

(21) Appl. No.: 13/455,872

(22) Filed: Apr. 25, 2012

Related U.S. Patent Documents

Reissue of:
(64) Patent No.: 7,818,254
Issued: Oct. 19, 2010
Appl. No.: 09/336,741
Filed: Jun. 21, 1999

(30) Foreign Application Priority Data

Apr. 7, 1999 (AU) ..... PP 9625

(51) Int. Cl.
*G06Q 99/00* (2006.01)

(52) U.S. Cl.
USPC ..... 705/50; 705/30; 705/45; 705/1.1

(58) Field of Classification Search
USPC ..... 705/11
See application file for complete search history.

(56) References Cited

U.S. PATENT DOCUMENTS

| | | | | |
|---|---|---|---|---|
| 4,736,294 | A | 4/1988 | Gill et al. | |
| 5,008,810 | A | 4/1991 | Kessel et al. | |
| 5,239,462 | A | 8/1993 | Jones et al. | |
| 5,367,619 | A * | 11/1994 | Dipaolo et al. | 395/149 |
| 5,611,052 | A | 3/1997 | Dykstra et al. | |
| 5,640,501 | A | 6/1997 | Turpin | |
| 5,699,527 | A | 12/1997 | Davidson | |
| 5,715,402 | A | 2/1998 | Popolo | |
| 5,765,144 | A | 6/1998 | Larche et al. | |
| 5,774,887 | A | 6/1998 | Wolff et al. | |
| 5,797,133 | A | 8/1998 | Jones et al. | |
| 5,870,721 | A | 2/1999 | Norris | |

(Continued)

FOREIGN PATENT DOCUMENTS

| | | |
|---|---|---|
| EP | 0 269 875 | 6/1988 |
| EP | 0 541 236 A1 | 5/1993 |

(Continued)

OTHER PUBLICATIONS

Technical Examination Report issued Aug. 30, 2012 for BR PI0009634-2, Brazilian Patent Office.

(Continued)

*Primary Examiner* — Calvin L Hewitt, II
*Assistant Examiner* — Zeshan Qayyum
(74) *Attorney, Agent, or Firm* — Stephen J. Weyer; Stites & Harbison, PLLC

(57) ABSTRACT

The present invention provides an apparatus and method for receiving and assessing an application made by an applicant. In one aspect, the apparatus includes: computing means configured or programmed to present a plurality of application forms to the applicant, to receive the forms once completed from the applicant and to assess the application; input means for the applicant to complete and return the forms to the computing means; and communication means for communicating or sending the assessment of the application to the applicant; wherein the computing means is configured or programmed to construct second and subsequent forms of the plurality of forms progressively on the basis of information provided by the applicant by means of the input means in the completed and received forms, to assess the application, and to communicate the assessment by means of the communication means.

22 Claims, 7 Drawing Sheets

(56) References Cited

U.S. PATENT DOCUMENTS

| | | | | |
|---|---|---|---|---|
| 5,878,403 | A | 3/1999 | DeFrancesco et al. | |
| 5,940,812 | A * | 8/1999 | Tengel et al. | 705/38 |
| 5,960,411 | A * | 9/1999 | Hartman et al. | 705/26.81 |
| 5,966,699 | A * | 10/1999 | Zandi | 705/38 |
| 5,995,947 | A * | 11/1999 | Fraser et al. | 705/38 |
| 6,208,979 | B1 * | 3/2001 | Sinclair | 705/38 |
| 6,217,074 | B1 * | 4/2001 | Conley, Jr. | 281/15.1 |
| 6,405,181 | B2 * | 6/2002 | Lent et al. | 705/38 |
| 7,437,343 | B1 * | 10/2008 | Josephson et al. | 706/60 |
| 2002/0077970 | A1 * | 6/2002 | Lebda et al. | 705/38 |

FOREIGN PATENT DOCUMENTS

| | | |
|---|---|---|
| EP | 0 895 173 A2 | 2/1999 |
| JP | 6348761 | 12/1994 |
| JP | 11-25168 | 1/1999 |
| KR | 1999-19276 | 5/1999 |
| WO | WO 95/06294 | 3/1995 |
| WO | WO 95/08810 | 3/1995 |
| WO | WO 96/11433 | 4/1996 |
| WO | WO 96/30850 | 10/1996 |
| WO | WO 98/10361 | 3/1998 |
| WO | WO 98/10558 | 3/1998 |
| WO | WO 98/39716 | 9/1998 |
| WO | WO 98/40835 | 9/1998 |
| WO | WO 99/09500 | 2/1999 |
| WO | WO 99/59084 | 11/1999 |

OTHER PUBLICATIONS

Examiner's first report issued Feb. 23, 2009 for AU 2008249161, Australian Patent Office, Woden, Australia.
Microsoft Press Computer Dictionary Third Edition, 1997.*

* cited by examiner

APPLICATION APPARATUS AND METHOD

Matter enclosed in heavy brackets [ ] appears in the original patent but forms no part of this reissue specification; matter printed in italics indicates the additions made by reissue.

FIELD OF THE INVENTION

The present invention relates to an apparatus and method for submitting and considering applications made by one party to one or more other parties of, for example, a financial nature, such as applying for and receiving approval for a financial loan. The parties will be referred to hereinafter as the applicant on the one hand and the recipient or recipients (of the application) on the other. For example, in the context of a financial loan application, a recipient may be a lender (such as a bank or other financial institution). In addition, numerous further applications of the invention are envisaged, in essentially any transaction that includes the submission, and subsequent assessment and approval or rejection, of an application made by an applicant to a recipient.

DESCRIPTION OF THE PRIOR ART

Existing practice for applying for, for example, finance (in the form of credit cards, personal loans, car loans, mortgages, etc.) generally requires an applicant to contact a recipient in the form of, for example, a lender, often in person or by telephone, and complete—orally or in writing—a loan application for subsequent consideration by the lender. The lender may, in fact, be one of several lenders, either so that the applicant can compare the costs and features of the possible loans, or a lender refuses an application thereby obliging the applicant to seek a loan elsewhere. This is often especially desirable in cases where a particularly large loan is sought. Alternatively, this task of consulting multiple lenders can be performed on behalf of the applicant by an information or finance broker, who will compare the available options on the applicant's behalf.

However, the application process and required information differs for each lender and each lender may in any event have non-refundable fees, so the applicant commonly and if possible proceeds with one (for example, recommended or previously used) lender. Subsequently, the applicant maintains regular contact with the chosen lender (or broker) to complete the application via traditional procedures. These include, after the completion of an application form, the compilation of documents, an interview with the lender, substantiation of submitted information, etc. These steps often form a part of a lender's standard application protocol and are required by the lender to be completed before a credit decision is made, even though in many cases much of information provided by the applicant may have no immediate bearing on that decision: to minimize delays the lender may request a standard array of information or documents, which will not in fact all be required in all cases.

In many situations, however, particularly for larger loans, the completion of the application can itself involve a great deal of iteration as the lender tries to understand the particulars of an application and ascertain all the required information. This may require returning to the applicant several or, indeed, many times. To combat this, some lenders use more advanced underwriters to review the complex applications. For example, mortgage applications from self-employed borrowers would be considered difficult, and require the attention of more skilled personnel. (As a rule of thumb, the smaller the loan size the less human involvement there is in assessing the application). However, even the most skilled underwriter will usually need to ask several clarifying or supplementary questions before he or she can make a credit decision, as each application can have so many variations resulting in millions of different application profiles.

Further, existing paper application forms are limited in their utility and flexibility; no single form can cover all possible scenarios. This is at times addressed by retaining a stock of standard forms and selecting that or those most pertinent in each case, but such an approach quickly reaches its limits when individual cases arise with, for example, multiple products and multiple lenders, and even multiple applicants.

If the loan is granted, regular maintenance of the loan account generally requires written or oral communication between the lender and the loan applicant (now customer).

Attempts have been made to automate the application process, so that less human interaction is required. Typically, however, this simply comprises the lender's provision of an application form that can be accessed, completed and submitted over a computer network (such as the internet). The application process then proceeds along traditional lines; after some preliminary consideration by the lender of the electronic application form, the loan applicant is contacted and the process proceeds as described above.

U.S. Pat. No. 5,870,721 (Affinity Technology Group, Inc.) discloses a system and method for real time loan approval, which attempts to further automate this process. According to the invention of this patent, a loan applicant submits his or her application for a loan by entering the requested or required information at a remote interface (preferably a kiosk). The information is transmitted to a data processing means, which may itself obtain further information from other databases, such as those of credit agencies. The application is then assessed without human assistance by calculating a single underwriting score and assessing the application on the basis of that score. The result is then communicated to the applicant.

This system and method, however, is restricted to simple loan applications suitable for determination on the basis of an underwriting score, and (in common with other attempts at such automation) pertains to cases where the loan application is for consideration by a single lender. The addition of, for example, multiple lenders would make this system impractical owing to the potentially enormous set of loan selection criteria and therefore prohibitively large number of questions that an applicant would have to respond to.

Australian Patent No. 687880 (Jeffrey A. Norris) discloses a closed loop financial transaction method and apparatus, and is related to U.S. Pat. No. 5,870,721. Again, however, there is no disclosure of how this invention could be used in a multiple-lender context, where the loan applicant would be required to supply an onerous quantity of information or to consider an prohibitive number of often irrelevant questions.

In addition, neither of these patents or other existing systems includes means by which the loan, once approved, may be managed or adjusted. For example, the customer may wish to increase repayments, which does not generally require further approval from the lender, though it may attract a charge. As mentioned above, existing systems do not allow a single application to be considered by multiple lenders, or—in such a case—for those multiple lenders to respond to the application in the knowledge of this non-exclusivity.

It is an object of the present invention, therefore, to provide an apparatus and method for receiving and assessing an application, including the ability to efficiently question the applicant to obtain the required information for one or more recipients.

It is a further object of the present invention to provide an apparatus and method for managing at least some aspects of an application after the initial application is lodged.

It is still a further object of the present invention to provide an apparatus and method for allowing multiple recipients to manage at least some aspects of an application after the initial application is lodged.

SUMMARY OF THE INVENTION

According to the invention, therefore, there is provided an apparatus for receiving and assessing an application made by an applicant, said apparatus including:

- computing means configured or programmed to present a plurality of application forms to said applicant, to receive said forms once completed from said applicant and to assess said application;
- input means for said applicant to complete and return said forms to said computing means; and
- communication means for communicating or sending said assessment of said application to said applicant;
- wherein said computing means is configured or programmed to construct second and subsequent forms of said plurality of forms progressively on the basis of information provided by said applicant by means of said input means in said completed and received forms, to assess said application, and to communicate said assessment by means of said communication means.

Thus, the contents of each form is determined on the basis of the information supplied in one or more earlier forms. In this manner, the total number of forms or length of each form may be reduced or minimized, as subsequent forms can omit questions rendered redundant by earlier forms.

It should also be noted that the applicant may, in some embodiments, be presented with one of the plurality of forms more than once (possibly at his or her request), but that that form may have been changed between such presentations according to information provided after the earlier presentation of that form. From another perspective in such a case, therefore, the form presented more than once in this manner, but altered between presentations, is in fact a different form when next presented. For example, the forms might be presented to the applicant as a number of tabbed forms on a computer screen, so that the applicant is free to commence with any of the forms (by selected a tab and bringing the corresponding form into the foreground), but later returning to an already viewed form.

Further, although second and subsequent forms are constructed progressively on the basis of information provided by said applicant, the term "construct" can include determining that an existing precedent form should be presented to the applicant without alteration.

Preferably said assessment may indicate approval or rejection of said application. In addition, said assessment may alternatively indicate that further information or human involvement is required before the application can be approved or rejected.

Thus, the assessment may simply indicate approval or rejection (where insufficient information would lead to automatic rejection), or a third option may be included where additional information or human involvement is required. It should also be noted that in the present application the term 'approval' includes provisional approval or prequalification, i.e. approval contingent upon the subsequent substantiation of some or all of the information provided during the application process. Also, the term 'applicant' can refer to either the person actually applying to the recipient or recipients of application, or an intermediary such as a broker.

The plurality of forms may be one of a plurality of groups of pluralities of forms.

Thus, the required information may be divided into groups of related information, and—within each group—second and subsequent forms determined from one of more earlier form within that group or, in some applications, earlier groups.

The computing means is configured or programmed to assess said application according to information received in any one or more of said forms.

Thus, the application procedure may be truncated as soon as the information received indicates that the application should be approved or rejected, even though the applicant has not as yet been asked to respond to remaining questions based on the total of the application recipient's selection criteria. For example, a loan application may be rejected after the applicant has completed only one form if the information returned in that form indicates that the requested loan is in excess of the absolute lending limits of the application recipient (or lender).

The apparatus may include a display means for presenting said forms. Preferably said computing means is operable to present said forms on a remote display means. The remote display means may be a computer connected to said apparatus by means of a computer network. Preferably said computer network is the internet, the world wide web, a commercial on-line service, an interactive broadcast, or other electronic on-line means.

The input means may be, for example, any suitable computer or computer input means, such as a computer keyboard, computer mouse or electronic pen, connected to said computing means. Preferably said input means is a computer connected to said apparatus by means of a computer network, such as the internet, the world wide web, a commercial on-line service, an interactive broadcast, or other electronic on-line means, including a computer keyboard and mouse connected to such a computer.

Preferably said communication means is an electronic information transfer system, such as electronic mail or a file transfer system. Preferably said electronic mail system is connected to or operable to access a computer network such as the internet.

Preferably said apparatus includes communication link means for obtaining additional information, from external databases or other sources of information, for consideration in assessing said application. The communication means may be operable as the communication link means.

Thus, the apparatus may obtain, for example, a credit report on the applicant for consideration as a part of the application assessment. Both the communication means and the communication link means may be the internet of a portion thereof.

Preferably said apparatus is configured or programmed to present one or more additional forms when information previously returned by said applicant contains one or more defects (owing to being incomplete, self-contradictory, contradictory with other information provided by the applicant, meaningless, etc.). Said additional forms may simply repeat previously presented forms, or may be new forms.

Preferably said apparatus is operable by said applicant to amend information previously returned by said applicant. This may occur either before or after the applicant has been assessed and, if after, the apparatus may re-assess the application.

Preferably said apparatus is configured or programmed to ignore certain of said defects on the basis of preset tolerances for decision certainty, typically determined on the basis of human judgement or statistical analysis. Alternatively said apparatus may be configured or programmed not to request certain information deemed non-critical in some or all circumstances.

Preferably said apparatus includes or can access application approval criteria of a plurality of application recipients, is configured or programmed to present sufficient of said forms to assess said application according to approval criteria of said each of said plurality of application recipients, and is configured or programmed to assess said application against the approval criteria of each of said recipients, and thereby form a respective separate assessment for each of said plurality of recipients.

The apparatus may be programmed or configured to assess said application according to multiple separate approval criteria for each of said one or more application recipients.

Thus, in the case of a loan application, the applicant can receive an assessment of the application from several lenders, or for more than one financial products from each of one or more lenders and select a lender/product combination. Alternatively the applicant can amend one or more of the forms to, in effect, request different terms and thereby alter the number of assessments.

Preferably said apparatus is configured or programmed to communicate one or more of said assessments to one or more of said plurality of recipients. More preferably, said apparatus is configured or programmed to communicate all of said assessments to all of those of said plurality of recipients whose respective assessment indicates approval.

Preferably said apparatus is operable by each of said plurality of recipients to adjust said respective approval criteria of each recipient in order to bid for selection by said applicant.

Thus, the applicant can accept the best or most favourable recipient for whom approval is indicated, or choose to be "auctioned" to the recipient with the best offer that correspond with the preferences of the applicant.

Preferably, if said application is approved, said apparatus is operable by said applicant to adjust or request the adjustment of one or more parameters of said application.

This allows the applicant to vary some of the details of the application after approval. In financial applications, this might include size or frequency of repayments.

Preferably said apparatus is operable by said applicant to display or transmit to said applicant some or all of said information and/or the status of said application.

Thus, the apparatus allows the applicant (or, later, customer) to inspect and/or manage some or all aspects of their application before and/or after approval (e.g. for a loan application: the issue of statements, additional redraws, additional repayments, changing bank account details, etc).

Preferably said apparatus includes means for requesting assistance, or is operable to request assistance, and is operable to communicate details of said application to an assistant so that said assistant can advise said applicant.

Preferably said assistant can view one or more of said forms during completion by said applicant.

Thus, if the applicant is unable to understand a part of one of the forms, he or she can request assistance, the assistant can view the form in its instant state of completion, and advise the applicant as necessary.

The present invention also provides a method for receiving and assessing an application made by an applicant to one or more recipients, including:

presenting a plurality of application forms to said applicant;

receiving said forms once completed from said applicant;

assessing said application; and communicating or sending said assessment of said application to said applicant;

wherein said method includes constructing second and subsequent forms of said plurality of forms progressively on the basis of information provided by said applicant in said completed and received forms.

Preferably said method includes collecting application approval criteria for said one or more recipients, determining the dependency if any of each of said criteria on each other, promoting in said sequence forms requesting information whose content renders a high, or the greatest possible, number of later questions redundant, and omitting said redundant questions from subsequent forms.

Thus, the total number of forms is reduced or minimized, by progressively reducing the 'total degrees of freedom' in the querying process.

Preferably the method includes presenting, in earlier forms, any questions where the response to each of said questions case may lead to the immediate rejection of the application.

For example, some recipients may not approve an application made by a minor, or—in the example of a loan application—outside certain lending limits. One or more forms requesting such information may be presented to the applicant early in the sequence of forms so that the applicant completes as few forms as possible; it would be a waste of the applicant's time to complete 10 or more forms, then to be asked for age or date of birth and only then be told that applications from minors will be rejected irrespective of all other considerations.

Preferably said method includes subsequently adjusting said sequence. For example, this may be done to improve clarity or ease of use, to reflect applicant preferences, or to achieve other objectives.

Thus, the otherwise ideal sequence may be adjusted so that the sequence makes for sense to the applicant, even at the expense of some efficiency.

The invention still further provides an apparatus for receiving and assessing an application made by an applicant, said apparatus including:

computing means configured or programmed to receive application information and to assess said application;

wherein said apparatus includes, or can access, application approval criteria of a plurality of application recipients, and said computing means is configured or programmed to assess said application according to said approval criteria of said each of said plurality of application recipients, whereby said apparatus can thereby form a respective separate assessment for each of said plurality of recipients.

Preferably said apparatus includes:

input means for said applicant to input said application to said computing means; and communication means for communicating or sending said assessments of said application to said applicant.

Preferably said computing means is configured or programmed to present a plurality of application forms to said applicant, and to receive said forms once completed from said applicant and to assess said application;

wherein said computing means is configured or programmed to construct second and subsequent forms of said plurality of forms progressively on the basis of information provided by said applicant by means of said input means in said completed and received forms, and to communicate said assessments by means of said communication means.

The invention still further provides a method for receiving and assessing an application made by an applicant, including:

receiving application information from said applicant;

assessing said application according to approval criteria of each of a plurality of application recipients; and forming a respective separate assessment for each of said plurality of recipients.

Preferably said method includes communicating or sending said assessments of said application to said applicant.

The present invention still further provides a method of processing an application made by an applicant, including:

receiving application information from said applicant;

providing said information to a plurality of application recipients;

receiving one or more bids for said application from one or more of said recipients;

forwarding said one or more bids to said applicant for selection or rejection of each of said one or more bids.

Preferably said method includes forming a respective separate assessment of said application for each of said plurality of recipients.

Preferably said method includes adjusting one or ore of said bids according to said selection or rejection, or to an adjustment of said information.

Thus, the applicant can be "auctioned" to the recipient with the best offer that corresponds with the preferences of the applicant (expressed in the application information).

According to the invention there is also provided an apparatus for processing an application made by an applicant, said apparatus including:

computing means configured or programmed to receive application information from said applicant, for directing said information to a plurality of application recipients, for receiving one or more bids for said application from one or more of said recipients, and for forwarding said one or more bids to said applicant for selection or rejection of each of said one or more bids.

BRIEF DESCRIPTION OF THE FIGURES

In order that the invention may be more clearly ascertained, a preferred embodiment will now be described, by way of example, with reference to the accompanying drawing in which.

DESCRIPTION OF A PREFERRED EMBODIMENT

Figure 1:
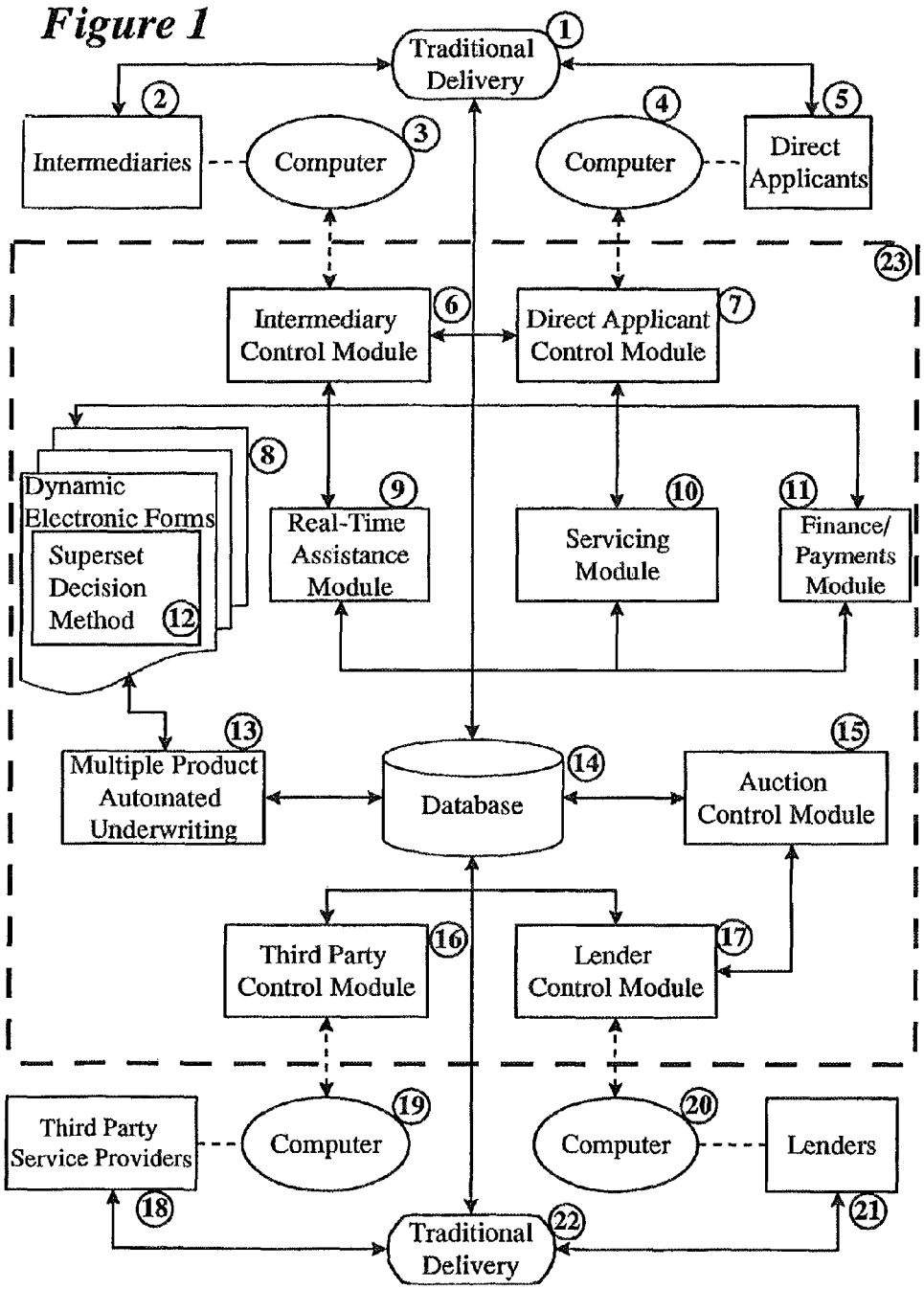
FIG. 1 is a flow chart showing the steps and components of a loan application system according to a preferred embodiment of the present invention.
Figure 2A:
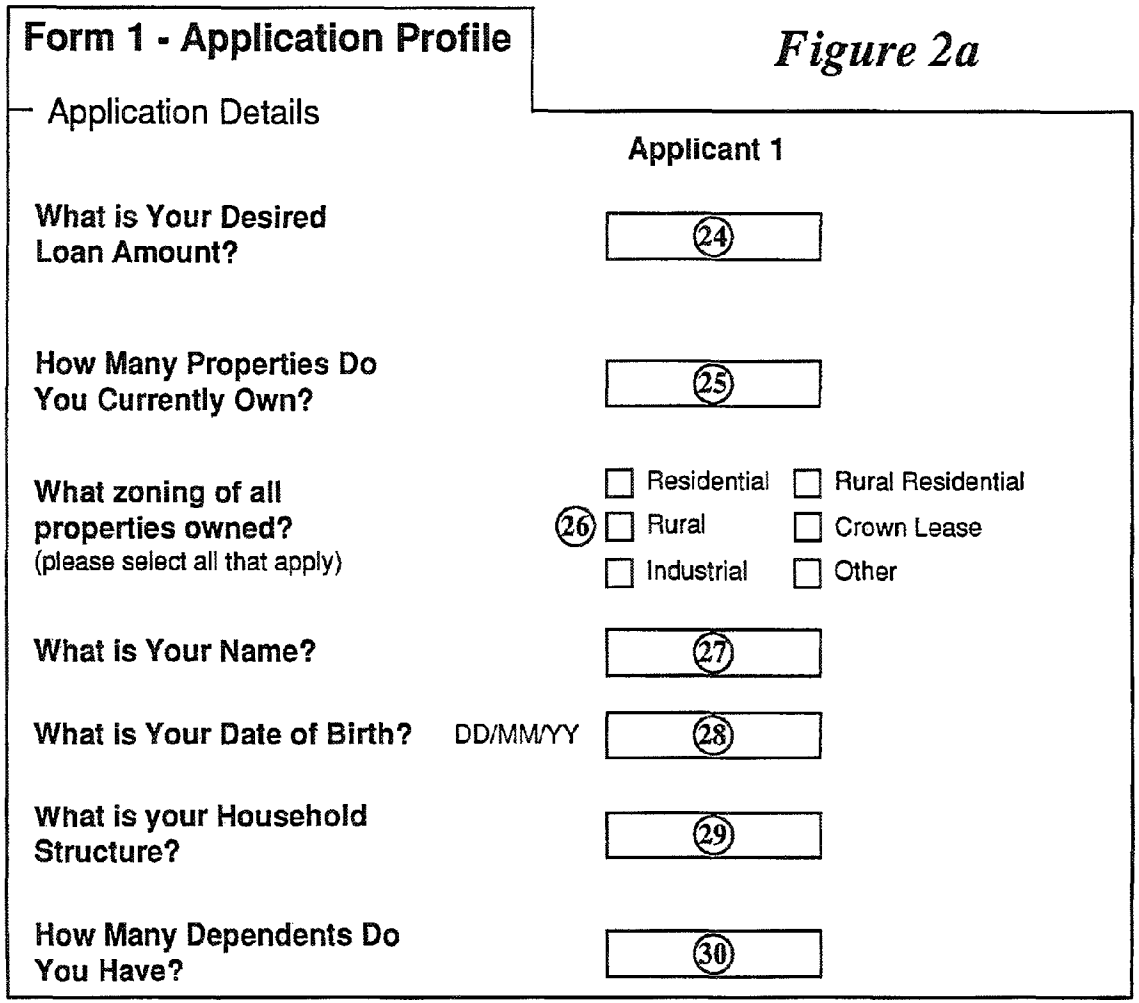
FIG. 2a is a view of electronic Form No. 1 according to the system of FIG. 1.
Figure 2B:
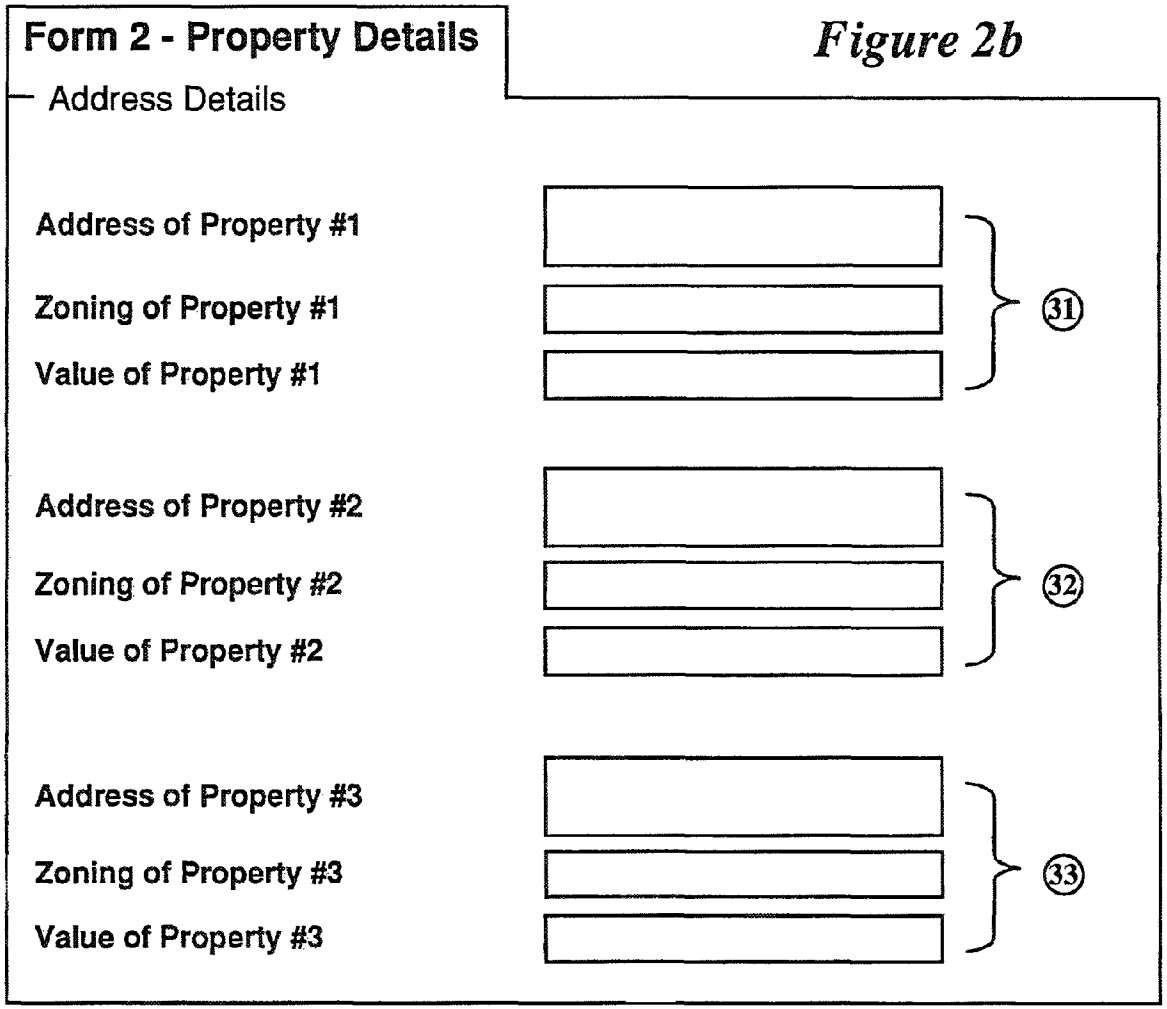
FIG. 2b is a view of electronic Form No. 2 according to the system of FIG. 1.
Figure 2C:
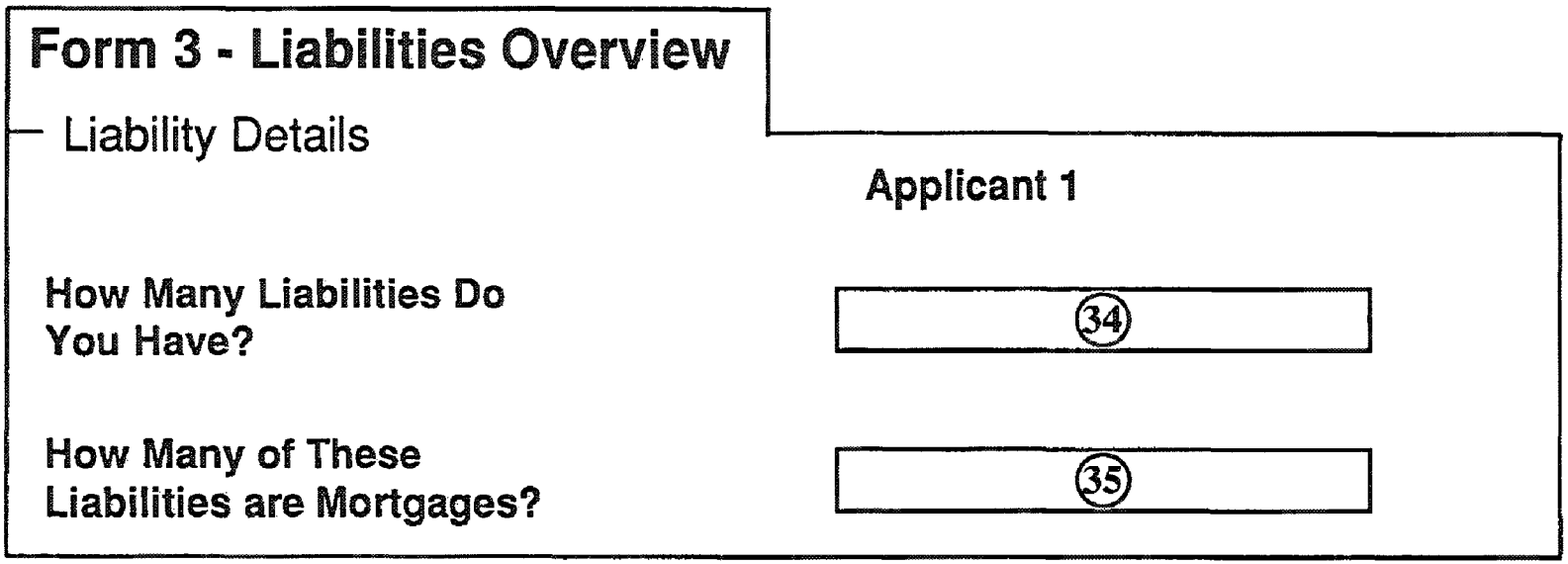
FIG. 2c is a view of electronic Form No. 3 according to the system of FIG. 1.
Figure 2D:
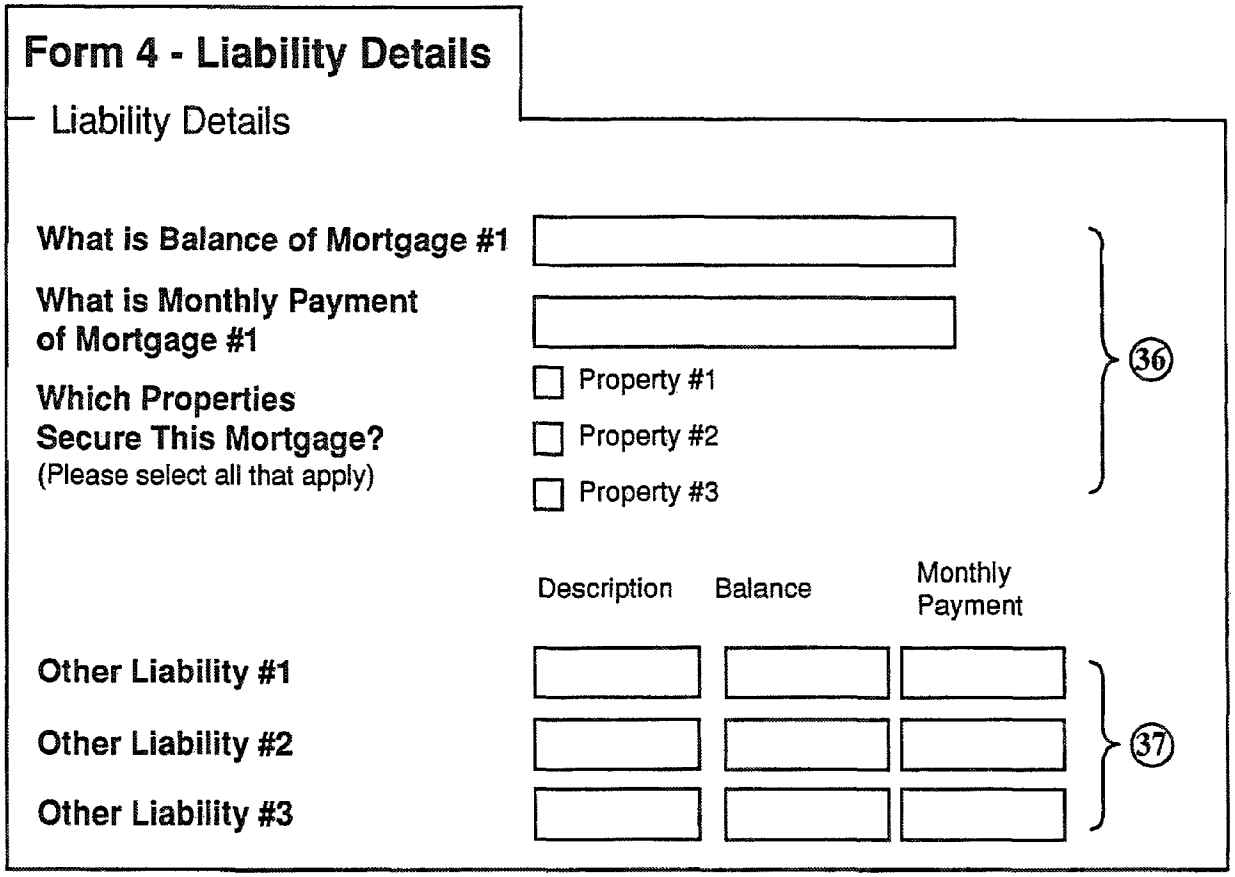
FIG. 2d is a view of electronic Form No. 4 according to the system of FIG. 1.
Figure 2E:
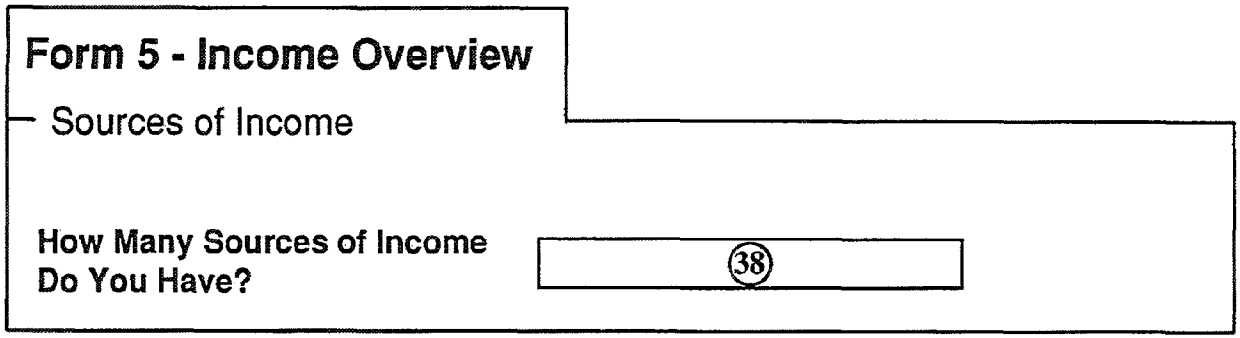
FIG. 2e is a view of electronic Form No. 5 according to the system of FIG. 1.
Figure 2F:
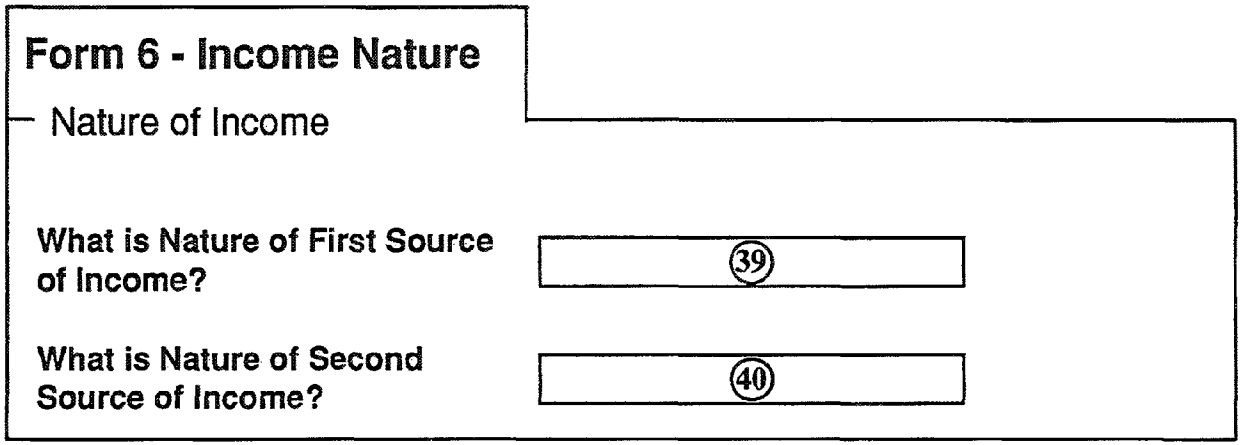
FIG. 2f is a view of electronic Form No. 6 according to the system of FIG. 1.
Figure 2G:
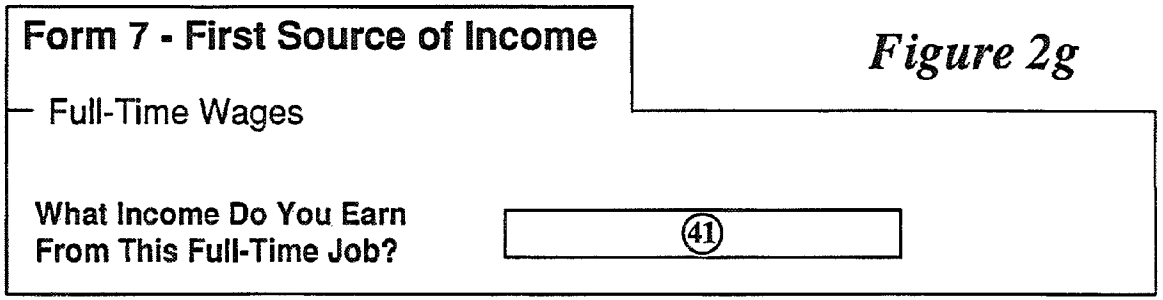
FIG. 2g is a view of electronic Form No. 7 according to the system of FIGS. 1.
Figure 2H:
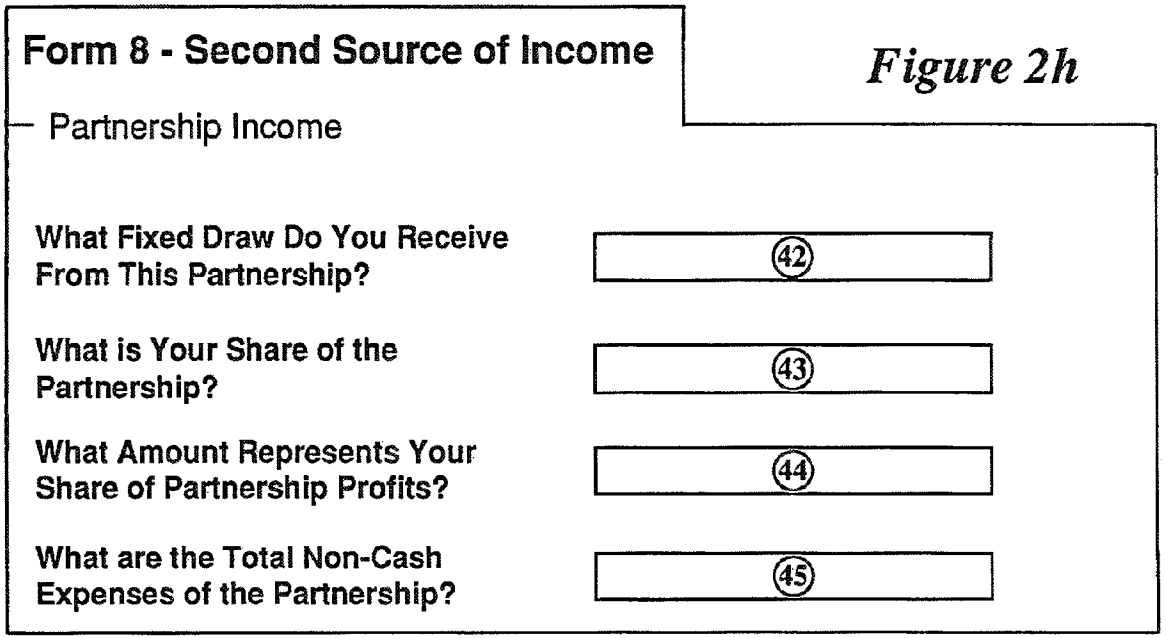
FIG. 2h is a view of electronic Form No. 8 according to the system of FIG. 1.

The following preferred embodiments of the present invention are in the area of finance and specifically loan applications, though as described above the invention is not limited to such applications.

Overview of the Preferred Embodiment

According to the preferred embodiment of the present invention there is provided a loan application, approval and management system that can be accessed over the internet, and may thus be described as having an open architecture, and which presents the applicant with a series of customised electronic application forms which captures the required information for automated assessment of the application based on the criteria of one or more lenders and, for each lender, one or more financial products. Once the applicant becomes a customer after approval (and verification, if any, of the information supplied during the application procedure), which may involve third party relationships (e.g. with solicitors, valuers, credit repositories, etc.), the preferred embodiment allows the customer to manage the on-going business relationship remotely, without human involvement.

Summary of the Preferred Embodiment

The system includes the following features:

Open architecture: the system can be accessed by applicants/customers or third parties without using any proprietary front-end hardware or equipment, such as dedicated kiosks, but rather is based on an open architecture principle utilizing the internet.

Superset Decision Method: a method based on initially gathering all loan or financial product criteria for all participating lenders, and systematically reducing the mathematical 'degrees of freedom' as the applicant progresses through the application procedure.

Dynamic Electronic Forms: the applicant is presented with a series of forms composed or constructed progressively and intelligently, based on the information provided by the applicant, rather than merely presenting the applicant either with a single standard form or set of forms, or with a form or set of forms merely selected from an existing set of forms.

Real-Time Assistance: applicants can engage in a real-time messaging dialogue with an assistant, who can view the form presently being completed by the applicant.

Automated Underwriting for Multiple Products/Lenders: the system simultaneously can evaluate an application according to the approval criteria of multiple products and multiple lenders.

Remote Application Management: the system allows users to advance, track and be informed of the progress of their application remotely and in real-time.

Self-servicing: once an applicant a customer, the invention allows the applicant to electronically manage their loan account without any human involvement.

Intermediary System: the system can also be accessed by finance brokers, financial planners and salespeople, for example, who lodge applications on behalf of their clients.

Loan Exchange: the system also acts as an 'auction' system that allows various lenders to identify desired applications and make bids to such prospective customers, with the winning bidder getting the business.

Detailed Description of the Preferred Embodiment

The preferred embodiment will be described by reference to the following Example, which relates to a home mortgage. Mortgages, owing to the large loan size (as opposed to, for example, credit cards or small personal loans) require a great deal of verification (e.g. collateral security, borrowing entities, sources of income, employment tests) and are considered amongst the most complex personal finance transactions.

The applicant's details to be used in the Example are as follows:

| Description | Profile | Total Amount | Monthly Payment |
|---|---|---|---|
| Name | Mr. Pat Hall born on Jan. 1, 1950 | — | — |
| Loan Purpose | Refinance existing mortgages<br>Consolidate other outstanding debts | — | — |
| Owned Properties | 2 residential properties (assume identical) | $350,000 | — |
| | 1 warehouse (industrial zoning) | $250,000 | — |
| Current Mortgages | 1 1st mortgage over 2 residential properties | $320,000 | $1,750 |
| Current other debts | Credit Card | $5,000 | $150 |
| | Personal Loan | $5,000 | $200 |
| | Auto Loan | $7,500 | $500 |
| Income Sources | Full-Time Sales Manager (per annum) | $50,000 | — |
| | Fixed Draw from Partnership (per annum) | $5,000 | — |
| | 25% of partnership profits | $10,000 | — |
| | Total non-cash expenses of partnership* | $5,000 | — |

*Non-cash expenses need to be added back to profits to derive cash flow provided by partnership.

There are 3 available lenders, A, B and C with the following credit criteria, income calculation methodology and product description for residential mortgages:

| Category | Description | Lender A | Lender B | Lender C |
|---|---|---|---|---|
| Credit Criteria | Loan Amount | >$40,000<br><$500,000 | >$50,000<br><$250,000 | >$10,000<br><$400,000 |
| | Security | 1st mortgage over: residential | 1st mortgage over: residential rural | 1st mortgage over: residential |
| | Net Surplus* | — | $500 per month | Must not be negative |
| | Debt Service Ratio* | Maximum of 35% | — | — |
| | Refinance Limits | Maximum of 3 other debts | Maximum of 7 other debts | No maximum |
| | Identity | Applicant name<br>Legal age | Applicant name<br>Legal age | Applicant name<br>Legal age |
| Methodology | Income Calculation | 100% for PAYE wages<br>Any self-employment income subject to following:<br>80% of profits for sole proprietorship<br>75% of share of partnership profits<br>50% of share of company profits | 100% for PAYE wages<br>Any self-employment income subject to following:<br>90% of cash flow for sole proprietorship<br>80% of share of partnership cash flow<br>70% of share of company cash flow | 100% for PAYE wages<br>Self-employment profits from any source will receive 80% credit |
| Product Description | Term | Up to 25 years | Up to 25 years | Up to 20 years |
| | Interest Offset | Yes | Yes | No |
| | Max LVR** | 90% of valuation | 95% of valuation | 90% of valuation |

*These are measures for serviceability of a loan; Net Surplus represents the discretionary income remaining after all loan commitments and an estimate of living expenses (corresponding to a lender provided formulae) are met; Debt Service Ratio is calculated as the total monthly debt payments divided by total gross monthly income.
**Max LVR is the maximum loan-to-value ratio allowed for a mortgage; for example, if the applicant qualifies based on serviceability, the maximum loan amount on a $200,000 property will be $180,000 if the Max LVR is 90%.

In the following, the system is described using the above scenario where appropriate.

Open Architecture

FIG. 1 is a flow chart showing the components of the system 23 of the preferred embodiment, in relation to elements external to the system 23 with which with the system interacts. Within the system 23, various communication links are indicated by solid-line arrows; the system 23 advantageously utilizes a number of existing communication links, such as the internet (indicated by dashed-line arrows).

According to the preferred embodiment, all access to the system 23 is via one of computers 3, 4, 19 or 20 depending on the type or class of user. Computers 3, 4, 19 and 20 are operable to communicate with the system 23 over the internet (possibly including by means of a modem and telephone connection), and the system 23 is adapted to be accessed by means of a web browser. The system 23 presents information in hypertext markup language or the like. Alternatively, computers 3, 4, 19 and 20 may communicate with the system 23 by any suitable alternative, including cable modems, ADSL, frame relay, ISDN and any other high bandwidth data transfer means including satellite and T1, T2 and T3 telecommunications platforms.

The four classes of users referred to above comprise Direct Applicants 5, Intermediaries (e.g., brokers, financial planners, salespeople) 2, one or more Lenders 21 and any required Third Parties Service Providers 18 depending on the finance product. A user accessing the system 23 may be prompted to provide identification and a password.

A Direct Applicant 5 can access or be prompted to access the Direct Applicant Control Module 7, which acts as a menu to a range of activities relevant to the Direct Applicant 5. These activities include but are not limited to:

Making product comparisons;
Obtaining product/lender information;
Applying on-line;
Making payments;
Tracking the status of an application;
Contacting and communicating with an assistant; and
Managing the loan account.

Some of these activities are described in further detail below.

An Intermediary 2 can access or be prompted to access the Intermediary Control Module 6, which acts as a menu to a range of activities relevant to the Intermediary 2. The Intermediary Control Module 6 illustrated in FIG. 1 represents multiple control modules depending on the type of Intermediary 2. For example, the Intermediary 2 could be a finance broker, a real estate agent, a financial planner, a salesperson, or a builder. A unique Intermediary Control Module 6 would exist for each type of Intermediary 2. The activities available to the Intermediary in addition to those available to Direct Applicants include but are not limited to:

Accessing market/industry information;

Joining a discussion forum relevant to the Intermediary 2 community;

Viewing all applications in progress;

Tools for assessing the performance of the Intermediary 2 organisation; and

Managing commission income.

Some of these activities may involve accessing another module, described further below.

A Third Party Service Provider 18 can access or be prompted to access the Third Party Control Module 16, which acts as a menu to a range of activities relevant to the Third Party Service Provider 18. The Third Party Control Module 16 illustrated in the figure represents multiple control modules depending on the type of Third Party Service Provider 18. For example, the Third Party Service Provider 18 could be a property valuer, a credit history repository, a title search company an insurer or a mercantile agency. A unique Third Party Control Module 16 would exist for each type of Third Party Service Provider 18. Such activities could include but are not limited to:

Posting valuation reports;

Transmitting credit reports;

Transmitting title searches;

Nominating accounts;

Issuing insurance policies; or

Raising invoices.

Some of these activities may involve accessing another module, described further below.

A Lender 21 can access or be prompted to access the Lender Control Module 17; this module 17 acts as a menu to a range of activities relevant to the Lender 21. These activities include but are not limited to:

Updating product information;

Changing lending criteria;

Viewing approved applications;

Making fund disbursements;

Tracking the status of applications;

Viewing auction results; or

Submitting auction bids.

Some of these activities may involve accessing another module, also described further below.

In the later stages of the loan application, such as during verification of the information provided applicant or the signing of contracts, the system 23 may employ known techniques (indicated by Traditional Delivery 1 and 22) as a supplementary means of communications with users. Also, in some cases, the documentation may be quite abundant and electronic data transfer may take too long or require too much memory and therefore is rendered impractical. Traditional Delivery 1 and 22 may include the use of a postal or courier service, or facsimile. Traditional Delivery 1 and 22 is used instead of, for example, electronic mail (between computers 3, 4, 19 or 20 and the system 23) when it is legally necessary, preferred, more expedient or more practical.

The open architecture of the system 23 means anyone with for example, a personal computer and internet access can use the system.

Superset Decision Method

The system can automatically underwrite a plurality of financial products for multiple separate lenders. It does this by employing a method referred to as the Superset Decision Method 12. This procedure creates a line of questioning to capture all of the relevant information required to underwrite any loan application. The Superset Decision Method 12:

1. Collects the superset of decision criteria for all participating lenders and products;
2. Identifies data requirements of decision criteria;
3. Ranks criteria according to level of dependency (i.e. data relationships between criteria);
4. Optimises the questioning sequence to reduce or minimize the total number of questions asked;
5. Introduces new data requirements and data transformations to reduce uncertainty and open-ended questions;
6. Adjusts optimal sequence for consumer preferences and other objectives; and
7. Sets tolerance for decision certainty based on human judgement or statistical analysis.

Once this process is completed, it is implemented in Dynamic Electronic Forms 8 (i.e. the required information is requested in forms presented sequentially to the applicant, and designed progressively as information is provided by the applicant), to underwrite a variety of products for multiple lenders within a specified tolerance for error. An example of the Superset Decision Method 12 follows using the case study already presented.

Example of Superset Decision Method

As discussed above, paper application forms are inadequate for automatic underwriting. In the Example of a single applicant applying for a mortgage, a paper application form cannot anticipate all the possible scenarios, such as the three properties. Also, the paper application form will in many cases not allow all of the required income information to be captured. This becomes particularly apparent when the application is to be assessed against the criteria of multiple lenders, each with multiple products, and where some or these products are complex, such as residential mortgages.

The principle of the Superset Decision Method 12 is that it begins by all possible, relevant questions and then determines the optimal sequence in which to ask the questions. Equally important, the Method 12 intelligently sequences the questions in a managed approach. Each step of the Superset Decision Method 12 is illustrated below.

Step 1. The superset of decision criteria are collected. A superset is statistically defined as the union or universe of all decision criteria for all lenders for a particular product (which, in the above Example, is a mortgage product).

In the Example, it should be noted that Lender C does not have a Net Surplus criterion. However, this is required by Lender A and B. Therefore, it must be included in the superset of decision criteria. In the Example, therefore, the superset of decision criteria includes the following: Loan Amount, Security, Net Surplus, Debt Service Ratio and Refinance Limits.

The boundary of the superset defines the outer range limits of all qualifying responses for the superset of decision criteria. For Example, the boundary of 'loan amount' in the Example would be "greater than $10,000 and less than $500,000" as this represents the limits for Lender A and Lender C. These boundary values are used in other steps. The superset of decision criteria and its boundary for the Example is summarised in the table below.

| Superset of Decision Criteria | Boundary |
|---|---|
| Loan Amount | Between $10,000 & $500,000 |
| Security | 1st mortgage over:<br>Residential<br>Rural |
| Net Surplus | Not applicable* |
| Debt Service Ratio | Maximum of 35% |
| Refinance Limits | No boundary |
| Identity | Must be legal age |

*As Net Surplus is calculated differently by different lenders, there is no uniform boundary as this would not be a like to like comparison; theoretically, however, a boundary can be defined by taking the minimum of the two methodologies of Lender B and Lender C.

Step 2. The data requirements of the decision criteria are identified, i.e. the data that should be requested from the applicant in order to ascertain the needed information to determine a decision criterion. For example, to calculate the Net Surplus and Debt Service Ratio, information on income will be required. A chart summarising the data requirements of the decision criteria in the Example is shown below. To illustrate that the Example is extremely simplified, some other data requirements that would be applicable in the practical application of the system 23 is displayed in parentheses.

| Decision Criteria | Data requirements |
|---|---|
| Loan Amount | Desired amount (assets, unpaid defaults, unpaid judgements, pending purchase contracts, unpaid tax liabilities, rates) |
| Security | Zoning, value, address (title type, special conditions, size of property, use of property, anticipated sale time, lending cautions, gearing ratio) |
| Net Surplus | Income, type of income, living expenses, interest*, depreciation*, (maintenance, school fees, social security, dependants, marital status) |
| Debt Service Ratio | Income, type of income, current liabilities, interest*, depreciation*, (duration, previous employment, allowances, time in occupation) |
| Refinance Limits | Current liabilities, monthly payments, (type of liability, store cards vs credit cards, current arrears, current arrangements, use of facility) |
| Identity | Name, DOB, (current address, previous address, current accommodation, previous accommodation, closest relative, phone) |

*Interest and depreciation is necessary as these are non-cash expenses and therefore, must be added back to net profits to derive cash flow.

Step 3. The criteria are ranked according to level of dependency (data requirements), i.e. the decision criteria are arranged by the amount of required information. As a guide, this should correspond to the number of data requirements. For the Example, this is summarised in the chart below:

| Decision Criteria | Level of Dependency | Data Requirements |
|---|---|---|
| Loan Amount | Low | Desired amount |
| Identity | Low | Name<br>DOB |
| Refinance Limits | Medium | For each liability:<br>Value<br>Monthly payment |
| Security | Medium | Number of securities<br>Zoning of property<br>Value<br>Address |
| Debt Service Ratio | High | Sources of income<br>Type of income<br>Amount of income |

-continued

| Decision Criteria | Level of Dependency | Data Requirements |
|---|---|---|
| | | Amount of interest<br>Amount of depreciation |
| Net Surplus | High | Sources of income<br>Type of income<br>Amount of income<br>Amount of interest<br>Amount of depreciation<br>Marital status*<br>Number of dependents* |

*Net Surplus is the calculation of disposable income after loan commitments and living expenses are deducted; living expenses are calculated based on the anticipated amount a certain family structure would need to spend; the family structure is usually based on the income of the household and the number of adults and dependents.

Step 4. The sequence is optimised to reduce or minimize the number of questions asked. The goal is to quickly come to a decision on an application. This involves asking for information in a sequence such that the number of questions and therefore the number of outcomes is reduced.

Taking into consideration the 'boundaries' of each decision criterion of the Example, it is preferable to request information on the desired loan amount first before requesting income details as, if the desired loan amount exceeds the maximum limit of any lender, there is no need to proceed with the questioning. Generally, to arrange the questions so that a reduced or minimum number of responses are requested, the questions are sequenced in order of lowest to highest dependencies. In the Example, this process yields the following line of questioning:

What is your desired loan amount?

What is your name?

What is your date of birth (DOB)?

What are you current liabilities?

What is address of security for each mortgage?

What is balance and monthly payment of each liability?

What is the address of all properties that you currently own?

What is value of all properties owned?

What is the zoning of all properties owned?

What are all of your sources of income?

What is the income from each source of income?

What is your household structure?

How many dependants do you have?

Sometimes, however, it may be desired to then adjust the number of questions in order to collect further information for marketing purposes. For Example, by disqualifying an applicant owing to a desired loan amount in excess of the maximum of any lender would preclude the collection of any demographic data on prospective customers. This will be explained further in step 6.

Step 5. New data requirements and data transformations are introduced to reduce uncertainty and open-ended questions. In certain circumstances, asking an additional question will eliminate uncertainties, reduce additional questions that need to be asked and remove any open-ended questions. For example, questions such as "What are your current liabilities?" are indeterminate and therefore open-ended. This is a common drawback of paper application forms which, for practical reasons, over-emphasize concision and therefore often present the applicant with abstruse questions or inadequate for responses. Therefore, asking the applicant to specify how many liabilities he or she has prior to supplying the liability-specific information will eliminate this uncertainty. Other questions would include:

How many properties do you own?
How many sources of income do you have?
What is the nature of the first (second, third, etc.) source of income?

Sometimes, these newly introduced questions can lead to further dependencies that can be utilised. In this case, it may be prudent to repeat Steps 2 and 3. For example, the number of properties the applicant owns has a relationship with the zoning of owned properties. If the applicant indicated that only 1 property was owned and the zoning was not an acceptable zoning within the boundary of the superset, then the application could be declined by deduction. The current sequence of questions, however, is not as efficient as the zoning question is not asked until the latter half of the process. Therefore, because of the dependency of the number of properties and the zoning of the property, the question related to property zoning can be promoted in priority.

Criteria transformations refer to an introduction of new data derived from existing data. These transformations can greatly optimise the line of questioning. In this simplified Example, it will be noticed that given the max LVR constraints of Lenders A, B and C and the value of all residential properties, the applicant will not be able to refinance all of his other liabilities. The applicant must decide what to do, and which loans should be refinanced. The amount outstanding and monthly payment for each liability can be transformed into new data called "Cost per $1 Outstanding" that is calculated by dividing the monthly payment by outstanding amount. If the user does not recognise this contradiction in the application, the system can default to refinancing the most expensive liability as defined by the newly transformed criteria with the highest value as this would represent the most expensive liability.

Step 6. The optimal sequence for consumer preferences and other objectives are adjusted. For example, the current sequence of questions asks about household structure last. This would seem an awkward point in the process to ask such information after very detailed information about the applicant's financial statement has been ascertained. Therefore, it would be more appropriate to ask this question when gathering identity details from the applicant. This step is very subjective and is determined progressively based on feedback provided by users of the system 23. After taking into consideration new data requirements and adjusting the sequence for consumer preferences, the new line of questioning in the Example is:

What is your desired loan amount?
How many properties do you currently own?
What is zoning of all properties owned?
What is your name?
What is your date of birth (DOB)?
What is your household structure?
How many dependants do you have?
What is address, zoning and value for each of the following properties?
How many liabilities do you have?
Of these liabilities, how many are mortgages?
What is the balance, monthly payment and property related to each mortgage?
What is the balance and monthly payment of other liabilities?
How many sources of income do you have?
What is nature of first [second, third, etc] source of income?
What is amount of income and type of income from each source of income?

It may be noted that there are more questions as a result of steps 5 and 6 compared to the questions at the end of step 4. However, these new data requirements and transformations are necessary as the responses to the questions at the end of step 4 would not enable the automatic underwriting of the application. For example, in the Example the applicant would not know what to enter when asked about income as he derives his income from a fixed draw, partnership profits and PAYE wages. One possibility is that he should enter the total of all amounts, but this would be incorrect as different lenders use different income calculation methodologies for self-employment income. Also, different tax rates to each source of income.

Step 7. The tolerance for decision certainty based on human judgement or statistical analysis is set. That is, some information may not be requested because the probability of such information making an impact on the outcome of the assessment is determined to be minimal or acceptable. In the Example above, it may be decided that number of dependants will always be assumed to be zero if it is a single applicant and two in the case of married applicants.

Although not entirely accurate, this degree of uncertainty imply a risk that a lender is prepared to accept. Thus, this step in the process involves identifying the data that can be included or removed, or ignored if the applicant fails to provide it or does so defectively, depending on the desired tolerance of the system owner. In the Example, it is desired to have 100% certainty, so none of the requested data is removed.

Summarised in the table below are possible responses to each of the questions in the Example:

| Question | Response |
|---|---|
| What is your desired loan amount? | $315,000 |
| How many properties do you currently own? | 3 |
| What is zoning of all properties owned? | Residential and industrial |
| What is your name? | Pat Hall |
| What is your date of birth (DOB)? | Jan. 1, 1950 |
| What is your household structure? | Single |
| How many dependants do you have? | 0 |
| What is address, zoning and value for each of the following properties? | A. 1 Apple Street; Residential, $175,000<br>B. 2 Apple Street; Residential, $175,000<br>C. 5 Industry Lane; Industrial, $250,000 |
| How many liabilities do you have? | 4 |
| Of these liabilities, how many are mortgages? | 1 |
| What is the balance, monthly payment and property related to each mortgage? | $320,000; $1,750; A&B |
| What is balance and monthly payment of other liabilities? | Credit Card: $5,000; $150 pm<br>Personal Loan: $5,000; $200 pm<br>Auto Loan: $7,500; $500 pm |
| How many sources of income do you have? | 2 |
| What is nature of first source of income? | Full-Time |
| What is amount of income and type of income from first source of income? | $50,000; PAYE Wages |
| What is nature of second source of income? | Partnership |
| How much do you receive in fixed draw? | $5,000 |
| What is your share of the partnership? | 25% |
| What is amount representing your share of partnership profits? | $10,000 |
| What are the total non-cash expenses of partnership | $5,000 |

It should be noted that the responses to the questions with the lowest dependency (i.e., loan amount, zoning, DOB) are acceptable. If they were not, there would have been no need to proceed with the remaining questions. More importantly, all the relevant information required to automatically underwrite the application (as will be discussed later) has been collected.

The above Example is extremely simplified to illustrate the Superset Decision Method. A different sequence would be followed according to loan purpose (e.g. home improvements, home purchase, cash advance). The system can accommodate considerably more complex examples. Complexities that might arise in a more realistic situation include:

What if there were two borrowers living in a de facto arrangement?

What if there were three borrowers; one married couple and one company entity?

What if the borrower was a family trust with 4 beneficiaries?

What if the applicant(s) had a poor credit history?

What if the borrower only joined the partnership 2 months ago?

What if the partnership was in the same industry that the applicant is a sales manager for?

What if the partnership lost money?

What were the previous residences of the applicant(s)?

Are any of the existing loan accounts in arrears?

Is the equipment being leased new or used?

Will the automobile being purchased be used for personal or business use?

Does the company applying for the lease have any other registered charges?

Have any previous loan accounts been in arrears?

What are the reasons for previous arrears?

Are there any outstanding judgements against the applicant(s)?

Is any of the purchase deposit from gifted funds?

Is the property consistent with other properties in the area?

Was the property purchased at an auction or by private sale?

Were any seller incentives included in the purchase price?

To complicate matters even further, different Lenders 21 have different rules concerning each of the criteria above. It will be apparent that the number of permutations of different situations and consideration is too many to contain in a document or to be completed in a reasonable length of time by existing techniques.

It should also be noted that not all steps need to be performed sequentially and some steps do not have to be performed at all. For example, if the owner or operator of the system 23 did not wish to introduce transformations, then step 5 can be skipped Dynamic Electronic Forms Existing market practice for finance applications requires an applicant to complete a printed application form, or its computerised equivalent (which in many cases simply reproduce a paper application form). As discussed above, such applications cannot capture all the required data needed to make a decision for all types of applicants.

Furthermore, existing forms create confusion for the applicant. As a simple example, he or she may be presented with a form (paper or otherwise) that has, say, one space for address details. However, some lenders require a previous address to be provided if the applicant has been at the current address for less than 2 years. More complex examples of Dynamic Electronic Forms 8 in finance applications involve the entry of income information. As seen in the Example above, different income information needs to be captured if the applicant derives his or her income from self-employment as a sole proprietor, as a partner in a partnership or as a shareholder of a company.

The system 23 couples Dynamic Electronic Forms 8 with the efficient information sequencing produced by the Superset Decision Method 12 to capture the application information in a practical and, indeed, user-friendly manner. Dynamic Electronic Forms 8 are, in principle, a collection of customised sub-forms that allows for the creation of a customised application based on the progressive responses of the user.

Referring to the Example, the system 23 does not present all of the requested information on one long form. Instead, the Dynamic Electronic Forms 8 ultimately presents a total of 8 forms (though this number is not known initially), each form covering a logical subset of questions. The questions relating to each form is summarised in the table below, and illustrated in FIGS. 2a to 2h respectively. Reference numbers in the 'Questions' column refer to these figures:

| Form No. | Form Description | Questions (reference in FIGS. 2a to 2h) |
|---|---|---|
| 1 | Captures initial low dependency data to ascertain whether the application should proceed | What is your desired loan amount? (24)<br>How many properties do you currently own? (25)<br>What is zoning of all properties owned? (26)<br>What is your name? (27)<br>What is your date of birth (DOB)? (28)<br>What is your household structure? (29)<br>How many dependants do you have? (30) |
| 2 | Based on response to Form No. 1, this form would present 3 sub-forms that would capture information on all three properties. | What is address, zoning and value for each of the following properties? (31 to 33) |
| 3 | The inputs to this form would help to format Form No. 4 | How many liabilities do you have? (34)<br>Of these liabilities, how many are mortgages? (35) |
| 4 | From Form No. 3, the system knows to provide enough space for details of 1 mortgage and 3 other liabilities | What is the balance, monthly payment and property related to each mortgage? (36)<br>What is balance and monthly payment of other liabilities? (37) |
| 5 | The input to this form would determine subsequent Forms Nos. 6 to 9 | How many sources of income do you have? (38) |
| 6 | The input to this form would determine Form No. 7 | What is nature of first (etc) source of income? (39, 40) |
| 7 | Based on response on Form No. 6, an appropriate PAYE wage income sub-form would be presented | What is the income from first source of income? (41) |
| 8 | Based on response on Form No. 6, an appropriate partnership income sub-form would be presented | How much do you receive in fixed draw? (42)<br>What is your share of the partnership? (43)<br>What is amount representing your share of partnership profits? (44)<br>What are the total non-cash expenses of partnership? (45) |

As shown in the Example, the responses on a previous form will determine the contents of the subsequent form. This innovation is a breakthrough in information capture as we are aware of no other system in the world that incorporates Dynamic Electronic Forms 12 to provide this level of usercustomisation. Furthermore, this innovation has applicability to industries outside of finance.

Real-Time On-Line Assistance

An inventive feature of the system is the usage of Real-Time Assistance Module 9. It is accessed by the user either through the Intermediary Control Module 6, the Direct Applicant Control Module 7, the Third Party Service Provider Module 18, or the Lender Control Module 17.

The system allows a user to ring an electronic bell represented by an icon on the computer screen which will alert an Assistant (generally human but possibly computerized in some simple cases) to the request for assistance. The system will have the ability for the Assistant to view the same screen as the user/applicant and communicate via real-time alphanumeric messaging or, if the user has such equipment, voice communication via the existing telecommunications link with the system.

For example, if a Direct Applicant 5 that is applying for a loan runs into a question on a particular Dynamic Electronic Form 8, the user can select an assistance icon. This will send the current Dynamic Electronic Form 8 that the Direct Applicant 5 is viewing to an Assistant's computer screen. Then a separate screen will appear that allows the Assistant to communicate with the Direct Applicant 5. As mentioned, this Real-Time Assistance 9 can also be accessed by any Intermediaries 2, Third Party Service Providers 18 and Lenders 21.

In the case of the Example, suppose the applicant has a question concerning Form No. 9. He is not sure whether depreciation should be included in non-cash expenses. Mr. Hall would select the "bell" icon on his screen which would activate the Real Time Assistance Module 9. This would result in the Assistant receiving an immediate notice that assistance is requested and the identical screen that the applicant is viewing is displayed on the screen of the Assistant. Then a sub-screen would appear on the screen of the applicant and the Assistant, who when converse by typing messages to each other. Alternatively, if the applicant's computer is equipped with the voice technology, he could communicate with the Assistant via a headset.

Alternatively, all users of the system 23 may use more conventional means of communication including the telephone and written or faxed correspondence.

Automated Underwriting for Multiple Products/Lenders

After the applicant completes the Dynamic Electronic Forms 8, the application is ready for underwriting (i.e. assessing). As mentioned above, the system 23 allows the application to be evaluated according to the credit criteria of one or more lenders.

It should be noted that Multiple Product Automated Underwriting 13 can only be conducted when a complete set of application information has been collected. The system 23 ensures that this condition is met by using Dynamic Electronic Forms 8 and the Superset Decision Method 12 as described above. Further, Multiple Product Automated Underwriting 13 can be accessed by either Intermediaries 2 or Direct Applicant 5, and the user can elect which Lenders 21 (i.e. against whose lending criteria) the application should be evaluated by. This preference would be indicated by the user while in the Intermediary Control Module 6 or the Direct Applicant Control Module 7. However, it is more advantageous for the user to elect have the application assessed against for all products and then decide which to pursue.

As the system can incorporate an effectively unlimited number of criteria and rules for different lenders, it can perform multi-product qualification and does not have to rely on simplified credit scoring (i.e. assessing the application based on an underwriting score).

In the Example, the Multiple Product Automated Underwriting 13 calculates the necessary credit criteria for each of the Lenders 21 and check to see if the application qualifies. The Multiple Product Automated Underwriting 13 then produces the following results:

| Credit Criteria | Lender A | Lender B | Lender C |
|---|---|---|---|
| Loan Amount | Ok | Ok | Ok |
| Security | Ok | Ok | Ok |
| Net Surplus* | — | Ok | Failed |
| Debt Service Ratio* | Ok | — | — |
| Refinance Limits | Ok | Ok | Ok |
| Identity | Ok | Ok | Ok |
| Final Decision | Approved | Approved | Rejected |

The results of this simultaneous credit assessment would be immediately communicated to the applicant by means of the Direct Applicant Control Module 7, preferably electronic mail sent over the internet. At this point, Mr. Hall can choose between Lender A and Lender B or he can elect to enter the 'auction' (see Loan Exchange, described below). In this simplified Example, the applicant was not asked what his product preferences were. In practice, the applicant would indicate what product features are preferred and, as a result, it is possible that the application may be approved against products lying outside the applicant's criteria. However, in such a case, the applicant would have to abandon the application, or relax or otherwise qualify his preferences.

Remote Application Management

An important preferred feature of the system 23 is that the application process can be managed remotely. A step-by-step description of the system's functionality is described below.

The system is accessed by either an Intermediary 2 or a Direct Applicant 5 by a computer 3 or 5 over existing communication links, such as the internet. The user will encounter either a Intermediary Control Module 6 or a Direct Applicant Control Module 7, according to user type. The Intermediary Control Module 6 and Direct Applicant Control Module 7 have numerous selections relevant to the Intermediary 2 or Direct Applicant 5 as discussed under Open Architecture. To lodge an application, the user will select this option from the menu.

The user will then proceed to respond to the questions displayed by the Dynamic Electronic Forms 8 which relies on a Superset Decision Method 12. At any time during the application process, the user may use Real-Time Assistance 9 feature of the system to contact an Assistant. Upon completing the Dynamic Electronic Forms 8 the system will be able to conduct Multiple Product Automated Underwriting 13 according to the responses and preferences provided by the user. The user will then know of the credit decision and what the options are.

At this point, depending on the finance product and lender requirements, the user may need to do one or more of the following:

Return signed documents. If the user needs to return any signed documents, these documents can be obtained by the user in any of the following ways: electronic download of required forms, electronic file delivery or Traditional Delivery 1. As an example, the Lender will typically require that a hard copy signed application form is obtained from the applicant.

Make a payment. If the user needs to then make a payment, the Finance/Payments Module 11 is accessed and the user has the ability to make a payment in one of several ways. The user can either make a payment by credit/debit card by entering the card details onto the electronic form, by making a direct deposit into a designated account, by providing written authorisation to deduct or charge an account (form can be retrieved like any other document), or by presenting payment by Traditional Delivery 1. Payments may be required to perform a valuation, for example, if the application is for mortgage finance.

Provide other supporting documentation. If the user needs to supply other supporting documentation, this can be done by electronically delivering requested documents or Traditional Delivery 1. For more complex financial transactions such as leases, mortgage finance and commercial finance, a significant amount of supporting documentation is required by Lenders 21.

Arrange third party services. If the user needs to arrange any third party services, this can be done electronically via either the Intermediary Control Module 6 or the Direct Applicant Control Module 7. For example, if a valuation needs to be scheduled in the case of mortgage finance, then the user can indicate preferred appointments times via an the electronic schedule that is accessed from the Intermediary Control Module 6 or Direct Applicant Control Module 7.

As discussed above, the application process for some financial products involves some third party verification. This verification is either performed by a Third Party Service Provider 18 or by the user. For example, on small balance loans (e.g. credit cards, personal loans), verification of application information with a credit information repository could be deemed sufficient by some lenders. On larger balance loans especially mortgages, the application information would need to be verified by multiple Third Party Service Providers 18 (e.g. land titles, valuer, CRAA) and applicant provided information (e.g., bank statements, payslips, etc.).

The Third Party Service Provider 18 can access the system and provide their services via any suitable communications link by means of computer 19 by accessing the Third Party Control Module 16. From here, the Third Party Service Provider 18 can provide the results of any services performed, which will then be updated to the Database 14 which contains all the details of the application and progress thereof.

Important preferred features of the system 23 are the Intermediary Control Module 6 and the Direct Applicant Control Module 7, which allow the user/applicant to track the status of an application in real-time (rather than, as generally presently occurs, telephoning the Lender 21 who checks internal contacts to get the information needed to respond to the query).

The system 23, however, allows the user, including both Intermediary 2 and Direct Applicant 5, to view the progress of the application by selecting the track application option on the respective control modules. This option then accesses the Database 14 which contains all information pertinent to the application. For example, it contains diary notes which is a notebook of all comments and actions taken by account officers.

Thus, a user can inspect what actions have been taken on a particular loan application. For example, the user can inspect a list detailing supporting documents that have and have not been received. The user can view the valuation report, if one is involved. The user can see a history of any payments made in respect of the application. Of course, the user can alternatively inquire about the status of an application via the traditional means of telephone or written or faxed correspondence.

Another preferred feature of the system is that any changes or amendments to the application's file on the Database 14 may trigger desired responses. For example, when a valuation report is received from a Third Party Service Provider 18 and this report is updated to the Database 14, the system automatically sends a message to the user by electronic mail informing the user of the receipt of valuation report. This message might alternatively by Traditional Delivery 1.

Referring to the Example, the table below summarises the remaining verification tasks that must be conducted and how the applicant responses by means of the system 23:

| Verification Activity | Method |
|---|---|
| Return signed application form | Can receive pre-filled application form in any one of following ways:<br>Downloaded<br>Electronically delivered<br>Posted, faxed or sent by courier<br>Actual signed or faxed copy must be returned |
| Schedule valuation appointment | Select preferred valuation date and times |
| Make payment for valuation | Can make payment by any of the following means:<br>On-line credit card payment<br>Faxed authorisation (can be downloaded or printed) to deduct/charge account<br>Direct deposit into nominated bank account<br>Can deliver cheque by post or courier |
| Provide tax returns for partnership<br>Provide payslip or group certificate<br>Provide latest mortgage statement<br>Provide latest credit card statement<br>Provide latest personal loan statement<br>Provide latest auto loan statement | Any of the following documents can be sent by:<br>Electronic image<br>Facsimile, courier or post |

The applicant in this Example can, at any time, also access the Direct Applicant Control Module 7 to see latest developments on the application. Here he will be able to view all outstanding supporting information, when payments were made, the results of any valuation report, and anticipated settlement time. Furthermore, he will be able to review any diary notes related to his account and he will automatically be informed of any changes to his application file.

As the above description describes and the Example illustrates, the system 23 allows the user to remotely manage the application process. The system 23 can transact, receive and send documents, send notifications and track the progress of any application for any financial product.

Self-Servicing

Current practice of managing a loan account relies on human interaction. For example, if the user needs an account statement, a call or written request must be made to the lending institution. The system 23, however, enables the user to remotely conduct the affairs of the loan account after funds have been disbursed by the Finance/Payments Module 11.

An Intermediary 2 or Direct Applicant 5 can manage a loan account by accessing the Servicing Module 10 through the Intermediary Control Module 6 or Direct Applicant Control Module 7. The Servicing Module 7, allows the user to do any of the following electronically:

View, print, download, receive loan account statements

Change payment dates;

Change payment amounts;

Change nominated account information;

Amend contact information;
Determine pay-out figures;
Request additional advances; or
Inquire about anything related to the loan account.

The user can also contact an Assistant by the more conventional means of telephone or written or faxed correspondence. However, this feature is both convenient and lowers the cost of servicing the applicant.

Intermediary System

Owing to the open architecture of the system 23, it can also be accessed by finance brokers, financial planners and accountants. For customers that seek such services, these Intermediaries 2 will be able to lodge applications on their behalf.

The broker community plays a role in over 10% of all finance applications. The system 23 also provides an array of features to this industry including:
Salesforce management tools;
Productivity projections and budgets;
Information on all applications in progress;
Information on all introduced customers;
Performance statistics on introduced business.

Such features can be amended and augmented as required. Such features would be accessed through the Intermediary Control Module 6 which would extract and manipulate the necessary information from the Database 14.

Loan Exchange

The system 23 also operates as an auction for loans. For such an auction to work, a minimum reasonable level of participants must exist. Therefore, assuming that the system has the requisite number of participants to have a robust auction, the system 23 has can properly and orderly conduct auctions.

The Auction Control Module 15 regulates the auction system. Users that have elected to auction their loan will have their preferences gathered, if any, and sorted into various categories. For example, some user may only want to consider credit cards with a reward program. Therefore, this preference may reduce the number of participating Lenders 21.

Lenders 21 can access the Auction Control Module 15 through the Lender Control Module 17. Lenders 21 will be able to sort available loans to bid on by any criteria they wish. As the invention utilises the Superset Decision Method 12, all information relevant to them can be retrieved from the Database 14 and displayed.

Referring to the Example, the applicant was approved for a mortgage with Lender A and Lender B. If the applicant wishes, he can elect to have his business go to the lowest bidder. Prior to this auction, the applicant's application, along with the applications of other users, are viewed by participating Lenders 21. The Lenders 21 would be able to review any credit criteria of the application. For example, Lenders 21 will be able to sort by Net Surplus if desired.

At regular intervals, the Auction Control Module 15 will begin to take various bids submitted by the participating Lenders 21 for applications. The Auction Control Module 15 will be capable of managing various auction styles depending on the most appropriate situation (e.g., Dutch, Blind, Best Bid). At the auction deadline, the Lender 21 that has offered the lowest interest rate (or other measure to be determined) will win the application.

If the applicant were offered a rate of 6.25% by Lender A and 6.15% by Lender B, he would presumably then proceed with Lender B. Alternatively, prior to the auction, the applicant may have specified a number of conditions which would be captured by the Database 14 and managed by the Auction Control Module 15. For example, he may have set a reserve rate of 6.00%. If this is the case, then the loan would not go to any of the bidding Lenders 21. Such a strategy might be used by the applicant if he does not require finance urgently.

In an alternative example of use of the Auction Control Module 15, the applicant may be considering obtaining a mortgage on a warehouse. He may therefore want to package his finance together as one offer to a Lender 21. This condition will be recognised by the Auction Control Module 15 and communicated to bidding Lenders 21.

Lender Access

The invention can also be accessed by Lenders 21 through the Lender Control Module 17. Here, Lenders 21 will have the ability to perform numerous tasks including but not limited to: changing credit criteria, viewing all funded application, reviewing previous auction results, projected number of new customers, product split, its share of total business, etc. New features and enhancements can be added based on Lender requirements and feedback.

Thus, the system 23 allows any Direct Applicant 5 or Intermediary 2 to remotely access a system that employs a method that can simultaneously and automatically underwrite an application for several loan products offered by several lenders. The system 23 also allows the user to remotely track and action the application process and, if and when the applicant becomes a customer, enables the user to remotely manage the loan account. In addition, the system 23 can auction loan applications to the Lender 21 with the best bid. The system also provides numerous value-added services to Lenders 21 and other Third Party Service Providers 18.

Modifications within the spirit and scope of the invention may readily be affected by persons skilled in the art. It is to be understood, therefore, that this invention is not limited to the particular embodiments described by way of example hereinabove.

The invention claimed is:

1. An apparatus for receiving an application made by an applicant and for assessing the application by a plurality of application recipients, said apparatus comprising:

computer memory; and a processor [for executing instruction for:];

*the computer memory storing instructions that, when executed, cause the processor to perform the steps of:*

(a) collecting at least two sets of decision criteria from at least two application recipients, each set comprising one or more decision criteria, and each decision criterion having a respective value, boundary or range;

(b) determining respective unions of the values, boundaries or ranges of respective same decision criterion present in the at least two sets of decision criteria by analyzing the data value, boundary or range boundary requirements of each same decision criteria in the at least two sets of decision criteria;

(c) generating a superset of decision criteria which comprises at least one decision criterion from the at least two sets of decision criteria with the determined respective union of values, boundary or ranges;

(d) storing or accessing the superset of decision criteria;

(e) ranking decision criteria according to level of dependency;

(f) optimizing a questioning sequence to reduce or minimize a total number of queries;

(g) presenting the applicant with a request for application information constituting the application for the two or more of the plurality of application recipients, said application information being requested by queries associated with said superset of decision criteria for the two or more of the plurality of application recipients, said queries presented according to said questioning sequence;

(h) receiving the application information;

(i) accessing said decision criteria of said application recipients;

(j) accessing said application according to said decision criteria of each of said application recipients; and (k) forming a respective separate assessment of said application for each of said application recipients, each respective separate assessment being an approval or a rejection of the application.

2. The apparatus as claimed in claim 1, wherein the processor is further for executing instruction for:

(a) requesting application information for the two or more of the plurality of application recipients by presenting a number of questions or a number of sets of questions in sequence to said applicant; and (b) receiving responses to said questions from said applicant, wherein said application information constitutes or is determined from said responses.

3. The apparatus as claimed in claim 1, further comprising:

an input device for said applicant to input said application to said computer memory; and a communication device for communicating or sending said assessments of said application to said applicant.

4. The apparatus as claimed in claim 1, wherein said processor is further for executing instruction for:

(a) presenting to the applicant a first selected form and receiving the first selected form containing first information after completion by the applicant, (b) constructing and immediately presenting to said applicant a second form pertaining to a respective selection from said decision criteria where said respective selection is made by said processor from said all application decision criteria on the basis of the first information provided by said applicant in said completed and received first selected form and receiving, via an input device, the second form containing second information after completion by the applicant, and then to progressively construct and immediately present to said applicant one or more subsequent forms pertaining to a respective selection from said superset of decision criteria where said respective selection is made by said processor from all decision criteria on the basis of some of the information previously provided by said applicant in previously completed and received forms and receiving the one or more subsequent forms after completion by the applicant, (c) wherein sufficient data entry fields are ultimately presented to said applicant in said second and the one or more subsequent forms to constitute the completed application, and (d) wherein the requesting of unnecessary information in said second and the one or more subsequent forms, which unnecessary information being information rendered redundant by the information provided by the applicant in an already completed form, can be avoided.

5. The apparatus as claimed in claim 1, wherein the processor is further for executing instruction for:

(a) promoting in said sequence, and thereby presenting sooner, those questions whose responses render a high, or the greatest possible, number of later questions redundant, and (b) omitting any questions thereby rendered redundant.

6. The apparatus as claimed in claim 1, wherein the processor is further for executing instruction for:

requesting the application information by presenting a number of questions or a number of sets of questions in sequence to said applicant, said questions comprising groups of questions pertaining to respective types of application information; and including an introductory question in at least one of said groups of questions to reduce ambiguity in the respective group of questions.

7. The apparatus as claimed in claim 1, wherein the processor is further for executing instruction for:

adjusting the sequence of questions yet to be presented to the applicant in response to application information supplied by the applicant in response to questions previously presented to the applicant.

8. The apparatus as claimed in claim 1, wherein the processor is further for executing instruction for ignoring one or more defects in application information returned by the applicant on the basis of preset tolerances for decision certainty.

9. The apparatus as claimed in claim 1, wherein the processor is further for executing instruction for refraining from requesting certain application information deemed non-critical in some or all circumstances.

10. The apparatus as claimed in claim 1, wherein the processor is further for executing instruction for forming the superset of decision criteria from the respective sets of decision criteria.

11. The apparatus as claimed in claim 1, wherein the processor is further for executing instruction for determining what application information is required to assess the application against the superset of decision criteria.

12. A method for receiving an application made by an applicant and for accessing the application by a plurality of application recipients, the method comprising the steps of:

a) collecting in a computer memory at least two sets of decision criteria from at least two application recipients, each set comprising one or more decision criteria, and each decision criterion having a respective value, boundary or range;

b) determining with a processor a respective union of the values, boundaries or ranges for each respective same decision criterion present in the at least two sets of decision criteria by analyzing the data value, boundary or range boundary requirements of each decision criteria in the at least two sets of decision criteria;

c) generating with said processor a superset of decision criteria which comprises at least one decision criterion from the at least two sets of decision criteria with the determined respective union of values, boundary or ranges;

d) determining with said processor application information which is required from the applicant to assess the application against the superset of decision criteria for the two or more of the plurality of application recipients;

e) ranking decision criteria according to level of dependency, using the processor;

f) optimizing a questioning sequence to reduce or minimize a total number of queries *using the processor*;

g) presenting the applicant with a request for the application information constituting the application for the two or more of the plurality of application recipients with said processor, the application information being requested by queries associated with the superset of decision criteria for the two or more of the plurality of application recipients, said queries being presented according to said questioning sequence;

h) electronically receiving the application information from said applicant;

i) electronically assessing the application with said processor according to the decision criteria of each of said application recipients; and j) electronically forming a respective separate assessment for each of said application recipients with said processor, wherein each respective separate assessment formed is an approval or a rejection of the application.

13. The method as claimed in claim 12, further comprising the steps of:

electronically receiving responses to said questions from said applicant, wherein said application information constitutes or is determined from said responses.

14. The method as claimed in claim 12, further comprising the step of electronically communicating or sending said assessments of said application to said applicant.

15. The method as claimed in claim 12, including:

promoting in said sequence, and thereby presenting sooner, those questions whose responses render a high, or the greatest possible, number of later questions redundant; and omitting any questions thereby rendered redundant.

16. The method as claimed in claim 12, including:

requesting the application information by presenting a number of questions or a number of sets of questions in sequence to said applicant; and receiving responses to said questions from said applicant, wherein said application information constitutes or is determined from said responses; and

17. The method as claimed in claim 12, including:

requesting the application information by presenting a number of questions or a number of sets of questions in sequence to said applicant, said questions comprising groups of questions pertaining to respective types of application information; and reducing ambiguity in the respective group of questions by including an introductory question in at least one of said groups of questions.

18. The method as claimed in claim 12, including:

requesting the application information by presenting a number of questions or a number of sets of questions in sequence to said applicant; and adjusting the sequence of questions yet to be presented to the applicant in response to application information supplied by the applicant in response to questions previously presented to the applicant.

19. The method as claimed in claim 12, including:

ignoring one or more defects in application information returned by the applicant on the basis of preset tolerances for decision certainty.

20. The method as claimed in claim 12, including:

refraining from requesting certain application information deemed non-critical in some or all circumstances.

21. A *non-transitory* computer readable medium containing executable instruction for receiving an application made by an applicant and for accessing the application by a plurality of application recipients, the executable instruction, when executed by a computing apparatus [for:], *causes the computing apparatus to perform the steps of:* a) collecting at least two sets of decision criteria from at least two application recipients, each set comprising one or more decision criteria, and each decision criterion having a respective value, boundary or range;

b) determining a respective union of the values, boundaries or ranges for each respective same decision criterion present in the at least two sets of decision criteria by analyzing the data value, boundary or range boundary requirements of each decision criteria in the at least two sets of decision criteria;

c) generating a superset of decision criteria which comprises at least one decision criterion from the at least two sets of decision criteria with the determined respective union of values, boundaries or ranges;

d) determining application information which is required from the applicant to assess the application against the superset of decision criteria for the two or more of the plurality of application recipients;

e) ranking decision criteria according to level of dependency;

f) optimizing a questioning sequence to reduce or minimize a total number of queries;

g) presenting the applicant with a request for the application information, constituting the application for the two or more of the plurality of application recipients, the application information being requested by queries associated with the superset of decision criteria for the two or more of the plurality of application recipients, said queries being presented according to said questioning sequence;

h) receiving the application information from the applicant;

i) assessing the application according to the decision criteria of each of the application recipients; and j) forming a respective separate assessment for each of the application recipients, wherein each respective separate assessment formed is an approval or a rejection of the application.

*22. The computer readable medium of claim 21, wherein:*

*(a) collecting at least two sets of decision criteria comprises collecting the at least two sets in computer memory;*

*(b) determining the respective union of values comprises determining with a computer processor the respective union of the values, boundaries or ranges for each respective same decision criteria;*

*(c) generating the superset of decision criteria comprises generating with the computer processor the superset of decision criteria;*

*(d) determining the application information comprises determining with the computer processor the application information;*

*(e) ranking the decision criteria comprises ranking the decision criteria using the computer processor;*

*(f) optimizing the questioning sequence comprises optimizing the questioning sequence using the computer processor;*

*(g) presenting the applicant with the request for the application information comprises presenting the applicant with the request for the application information using the computer processor;*

*(h) receiving the application information comprises electronically receiving the application information;*

*(i) assessing the application comprises electronically assessing the application with the computer processor; or*

*(j) forming a respective separate assessment for each of the application recipients comprises electronically forming a respective separate assessment for each of the application recipients with the computer processor.*

* * * * *